United States Patent
Lee et al.

(10) Patent No.: US 11,093,719 B2
(45) Date of Patent: Aug. 17, 2021

(54) MACHINE TRANSLATION METHOD AND APPARATUS

(71) Applicant: Samsung Electronics Co., Ltd., Suwon-si (KR)

(72) Inventors: Hodong Lee, Yongin-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 16/013,055

(22) Filed: Jun. 20, 2018

(65) Prior Publication Data

US 2019/0251174 A1 Aug. 15, 2019

(30) Foreign Application Priority Data

Feb. 12, 2018 (KR) .......................... 10-2018-0017274

(51) Int. Cl.
*G06F 40/58* (2020.01)
*G06F 40/51* (2020.01)

(52) U.S. Cl.
CPC .............. *G06F 40/58* (2020.01); *G06F 40/51* (2020.01)

(58) Field of Classification Search
CPC .............. G06F 17/2854; G06F 17/289; G06F 17/2827; G06F 40/58; G06F 40/51
See application file for complete search history.

(56) References Cited

U.S. PATENT DOCUMENTS

| | | | |
|---|---|---|---|
| 7,295,963 B2 | 11/2007 | Richardson et al. | |
| 9,164,987 B2 | 10/2015 | Chen | |
| 9,342,499 B2 | 5/2016 | Madnani et al. | |
| 2014/0358524 A1 | 12/2014 | Papula et al. | |
| 2016/0140114 A1* | 5/2016 | Orsini ................. | G06F 17/2854 704/2 |
| 2016/0350290 A1* | 12/2016 | Fujiwara ............. | G06F 17/2854 |

FOREIGN PATENT DOCUMENTS

| | | |
|---|---|---|
| JP | 2006-318202 A | 11/2006 |
| JP | 3912343 B2 | 5/2007 |
| JP | 2016-71439 A | 5/2016 |
| KR | 10-2005-0034687 A | 4/2005 |
| KR | 10-0958340 B1 | 5/2010 |
| KR | 10-2013-0088575 A | 8/2013 |
| KR | 10-2014-0079598 A | 6/2014 |
| KR | 10-1664258 B1 | 10/2016 |
| KR | 10-2017-0017851 A | 2/2017 |

* cited by examiner

*Primary Examiner* — Thomas H Maung
(74) *Attorney, Agent, or Firm* — NSIP Law

(57) ABSTRACT

A processor-implemented machine translation method includes translating a source sentence expressed in a source language into a target language to determine a target sentence, determining, based on a reliability of the target sentence, whether the target sentence is appropriate as a translation result of the source sentence, and re-determining a target sentence corresponding to the source sentence in response to a result of the determining being that the target sentence is inappropriate as the translation result.

26 Claims, 10 Drawing Sheets

| Previous source sentence | Previous target sentence | Reliability |
|---|---|---|
| A1 | B1 | 0.91 |
| A2 | B2 | 0.97 |
| A3 | B3 | 0.83 |
| ⋮ | ⋮ | ⋮ |

MACHINE TRANSLATION METHOD AND APPARATUS

CROSS-REFERENCE TO RELATED APPLICATIONS

This application claims the benefit under 35 USC 119(a) of Korean Patent Application No. 10-2018-0017274 filed on Feb. 12, 2018, in the Korean Intellectual Property Office, the entire disclosure of which is incorporated herein by reference for all purposes.

BACKGROUND

1. Field

The following description relates to relates to a machine translation method and apparatus.

2. Description of Related Art

A user may use machine translation to translate a sentence, a paragraph, a phrase, or a word expressed in a language different from a native language of the user. However, when a result of the machine translation includes an error, it is difficult for the user to understand the result of the machine translation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented machine translation method includes translating a source sentence expressed in a source language into a target language to determine a target sentence; determining, based on a reliability of the target sentence, whether the target sentence is appropriate as a translation result of the source sentence; and re-determining a target sentence corresponding to the source sentence in response to a result of the determining being that the target sentence is inappropriate as the translation result.

The re-determining of the target sentence may include re-determining the target sentence using a sentence retrieved from a database (DB) that is similar to the source sentence, or adjusting a search technique used in a translation model that translates the source language into the target language, or using a third language different from the source language and the target language.

The re-determining of the target sentence may include retrieving a sentence similar to the source sentence from a database (DB) storing sentences that have been successfully translated, and either re-determining a previous translation result of the retrieved sentence as the target sentence, or re-determining the target sentence by translating the retrieved sentence into the target language.

The retrieving of the sentence similar to the source sentence from the DB may include retrieving the sentence similar to the source sentence from the DB based on either one or both of a similarity between the source sentence and each of the sentences stored in the DB, and a level of matching between a keyword extracted from the source sentence and each of the sentences stored in the DB.

The re-determining of the target sentence further may include, in response to a determination that a sentence similar to the source sentence is not stored in the DB, modifying the source sentence to a sentence in a normalized form, and translating the modified source sentence into the target language to re-determine the target sentence.

The re-determining of the target sentence further may include, in response to a determination that a sentence similar to the source sentence is not stored in the DB, substituting a word having a similar meaning for at least one word in the source sentence, and translating the source sentence including the substituted word into the target language to re-determine the target sentence.

The processor-implemented machine translation method may further include adding the source sentence and either the target sentence or the re-determined target sentence to the DB in response to a determination that either the target sentence or the re-determined target sentence is appropriate as the translation result.

The re-determining of the target sentence may include adjusting a beam width of a beam search used in a translation model that translates the source language into the target language to re-determine a target sentence corresponding to the source sentence.

The re-determining of the target sentence may include translating the source language into a third language to determine a third sentence; and translating the third sentence into the target language to re-determine the target sentence.

The re-determining of the target sentence may include re-determining a candidate target sentence selected by a user from a plurality of candidate target sentences corresponding to the source sentence as the target sentence; or receiving, as a re-input from the user, at least one replacement word replacing a word in either the source sentence or a back-translated sentence generated by translating the target sentence back into the source language, and translating either the source sentence or the back-translated sentence that may include the at least one replacement word into the target language to re-determine the target sentence.

The processor-implemented machine translation method may further include outputting either the target sentence or the re-determined target sentence as either one or both of text and a speech signal in response to a determination that either the target sentence or the re-determined target sentence is appropriate as the translation result.

In another general aspect, a non-transitory computer-readable medium stores instructions that, when executed by a processor, cause the processor to perform the processor-implemented machine translation method described above.

In another general aspect, a machine translation apparatus includes a processor; and a memory storing at least one instruction that is executable by the processor, wherein the processor executing the at least one instruction configures the processor to translate a source sentence expressed in a source language into a target language to determine a target sentence, determine, based on a reliability of the target sentence, whether the target sentence is appropriate as a translation result of the source sentence, and re-determine a target sentence corresponding to the source sentence in response to a result of the determining being that the target sentence is inappropriate as the translation result.

The processor may be further configured to re-determine the target sentence using a sentence retrieved from a database (DB) that is similar to the source sentence, or adjusting a search technique used in a translation model that translates the source language into the target language, or using a third language different from the source language and the target language.

The processor may be further configured to re-determine the target sentence by retrieving a sentence similar to the source sentence from a database (DB) storing sentences that have been successfully translated, and either re-determining a previous translation result of the retrieved sentence as the target sentence, or re-determining the target sentence by translating the retrieved sentence into the target language.

The processor may be further configured to re-determine the target sentence by adjusting a beam width of a beam search used in a translation model that translates the source language into the target language to re-determine a target sentence corresponding to the source sentence.

The processor may be further configured to translate the source language into a third language to determine a third sentence; and translate the third sentence into the target language to re-determine the target sentence.

The processor may be further configured to output either the target sentence or the re-determined target sentence as either one or both of text and a speech signal in response to a determination that either the target sentence or the re-determined target sentence is appropriate as the translation result.

In another general aspect, a processor-implemented machine translation method includes translating a source sentenced expressed in a source language into a target language to determine a target sentence corresponding to the source sentence; outputting the target sentence as a translation result of the source sentence in response to a reliability of the target sentence satisfying a predetermined criterion; re-determining a target sentence corresponding to the source sentence in response to the reliability of the target sentence not satisfying the predetermined criterion; and outputting the re-determined target sentence as a re-determined translation result of the source sentence in response to a reliability of the re-determined target sentence satisfying the predetermined criterion.

The predetermined criterion may be the reliability of the target sentence or the re-determined target sentence exceeding a preset threshold.

The re-determining of the target sentence may include retrieving a sentence that is similar to the source sentence from a database (DB) storing sentences that have been successfully translated; and translating the retrieved source sentence into the target language to obtain the re determined target sentence.

The re-determining of the target sentence may include retrieving a previous translation result of a sentence that is similar to the source sentence from a database (DB) storing sentences that have been successfully translated and a previous translation result of each of the sentences; and determining the retrieved previous translation result as the re-determined target sentence.

The translating may be performed using a translation model that uses a search technique to find an optimal translation, and the re-determining of the target sentence may include adjusting the search technique of the translation model; and translating the source sentence into the target language using the translation model having the adjusted search technique to obtain the re-determined target sentence.

The search technique may be a beam search; and the adjusting of the search technique may include increasing a beam width of the beam search.

The re-determining of the target sentence may include translating the source sentence into a third language to determine a third sentence; and translating the third sentence into the target language to obtain the re-determined target sentence.

The re-determining of the target sentence may include providing candidate target sentences corresponding to the source sentence; and receiving an input selecting one of the candidate target sentences as the re-determined target sentence.

The re-determining of the target sentence may include receiving a replacement word replacing a word in either the target sentence or a back-translated sentence obtained by translating the target sentence back into the source language; and translating either the target sentence including the replacement word or the back-translated sentence including the replacement word into the target language to obtain the re determined target sentence.

In another general aspect, a processor-implemented machine translation method includes translating a source sentenced expressed in a source language into a target language to determine a target sentence corresponding to the source sentence; outputting the target sentence as a translation result of the source sentence in response to a determination that the target sentence is an appropriate translation of the source sentence based on a reliability of the target sentence; in response to a determination that the target sentence is not an appropriate translation of the source sentence, obtaining a first re-determined target sentence corresponding to the source sentence based on a sentence that is similar to the source sentence and is stored in a database (DB) storing sentences that have been successfully translated; outputting the first re-determined target sentence as a translation result of the source sentence in response to a determination that the first re-determined target sentence is an appropriate translation of the source sentence based on a reliability of the first re-determined target sentence; in response to a determination that the first re-determined target sentence is not an appropriate translation of the source sentence, obtaining a second re-determined target sentence by either adjusting a search technique of a translation model used to translate the source sentence into the target sentence, and translating the source sentence into the target language using the translation model having the adjusted search technique to obtain the second re determined target sentence, or translating the source sentence into a third language to determine a third sentence, and translating the third sentence into the target language to obtain the second re determined target sentence; outputting the second re-determined target sentence as a translation result of the source sentence in response to a determination that the second re-determined target sentence is an appropriate translation of the source sentence based on a reliability of the second re-determined target sentence; in response to a determination that the second re-determined target sentence is not an appropriate translation of the source sentence, providing candidate target sentences corresponding to the source sentence; determining whether an input selecting one of the candidate target sentences has been received; in response to a determination that the input selecting one of the candidate target sentences has been received, determining the selected candidate target sentence to be a third re-determined target sentence, and outputting the third re-determined target sentence as a translation result of the source sentence; and in response to a determination that the input selecting one of the candidate target sentences has not been received, receiving a replacement word replacing a word in either the target sentence or a back-translated sentence obtained by translating the target sentence back into the source language, translating either the target sentence including the replacement word or the back-translated sentence including the replacement word into the target language to obtain a fourth re-determined target sentence; and outputting the fourth re-determined target sentence as a translation result of the source sentence.

Other features and aspects will be apparent from the following detailed description, the drawings, and the claims.

BRIEF DESCRIPTION OF THE DRAWINGS

FIG. 4 illustrates an example of a process of re-determining a target sentence based on sentences stored in a database (DB).

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms, including technical and scientific terms, used herein have the same meaning as commonly understood by one of ordinary skill in the art to which this disclosure pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1:
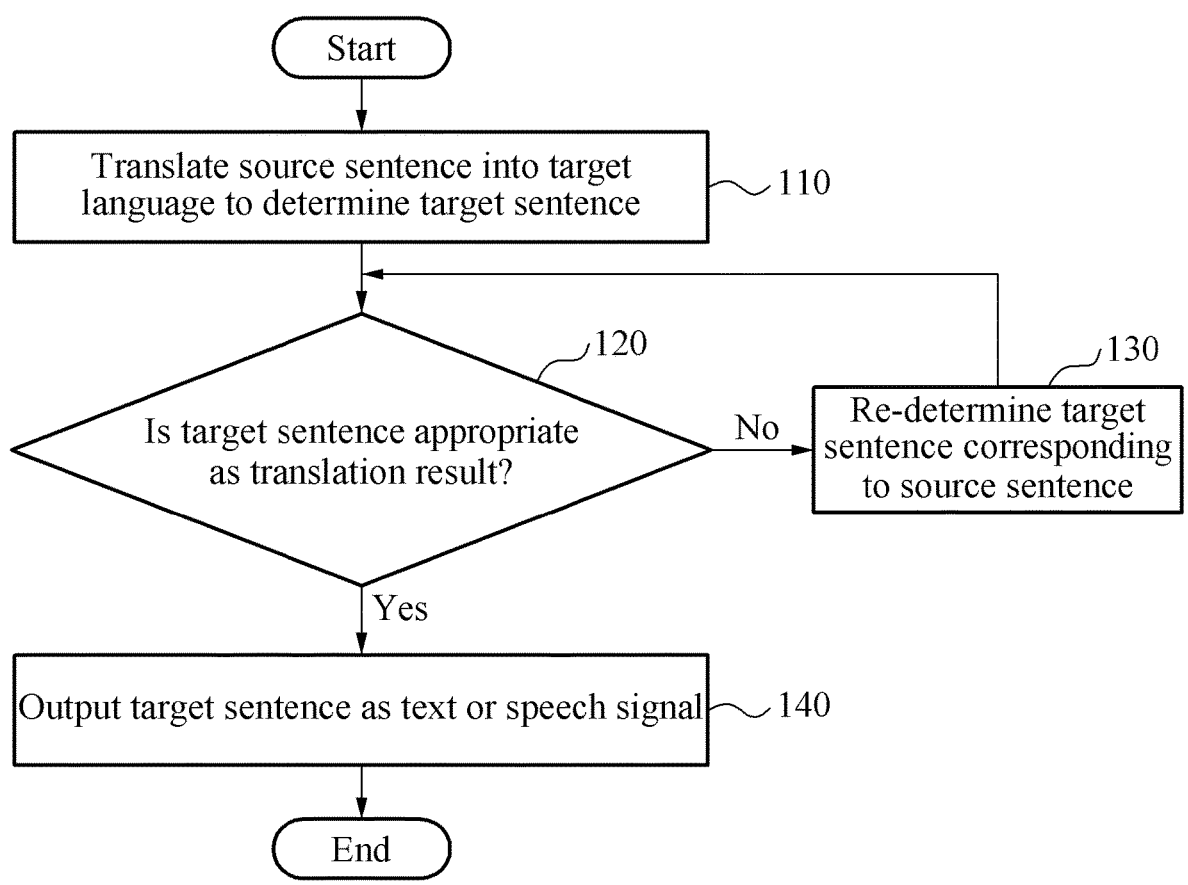
FIG. 1 illustrates an example of a machine translation method.

FIG. 1 illustrates an example of a machine translation method.

A machine translation apparatus translates a source sentence expressed in a source language into a target language to determine a target sentence. The determined target sentence is either output or re-determined based on a reliability of the determined target sentence by the machine translation apparatus, as will be further described below with reference to FIG. 1.

In one example, the machine translation method of FIG. 1 is performed by a processor included in the machine translation apparatus.

Referring to FIG. 1, in operation 110, the machine translation apparatus translates a source sentence expressed in a source language into a target language to determine a target sentence. The machine translation apparatus receives, as an input, the source sentence as text or a speech signal from a user. For example, when the source sentence is input as a speech signal, a speech recognition process of converting a speech signal to a source sentence is additionally performed. The machine translation apparatus determines the target sentence from the source sentence based on a neural network-based translation model that translates the source language into the target language.

In operation 120, the machine translation apparatus determines whether the target sentence is appropriate as a translation result of the source sentence based on a reliability of the target sentence.

The reliability of the target sentence is determined based on a similarity between sentences using a back-translation, a similarity between sentences using a translation into a third language, or a decoding score of a translation model (for example, a decoding probability value or a softmax probability value).

In one example, when the back-translation is used, a target sentence B generated by translating a source sentence A is translated back into the source language to determine a comparison sentence A', and a reliability of the target sentence B is determined based on a similarity between the source sentence A and the comparison sentence A'.

In another example, when the translation into the third language is used, a source sentence A is translated into the third language to determine a third sentence C, and a target sentence B is translated into the third language to determine a third sentence C'. In this example, a reliability of the target sentence B is determined based on a similarity between the third sentences C and C'. The third language is any language other than the source language and the target language.

A similarity between the source sentence A and the comparison sentence A', or between the third sentences C and C', is determined using any one of a bilingual evaluation understudy (BLEU) method, a National Institute of Standards and Technology (NIST) method, a word error rate (WER) method, a Metric for Evaluation of Translation with Explicit ORdering (METEOR) method, a Recall-Oriented Understudy for Gisting Evaluation (ROUGE) method, and an F1 score method. However, other methods of determining a similarity between sentences may be used. In one example, the similarity is determined by a model trained to determine a similarity between sentences.

The machine translation apparatus determines whether the target sentence is appropriate as a translation result of the source sentence based on whether the reliability of the target sentence satisfies a predetermined criterion. When the reliability of the target sentence satisfies the criterion, the target sentence is determined to be appropriate as the translation result of the source sentence. When the reliability of the target sentence does not satisfy the criterion, the target sentence is determined to be inappropriate as the translation result of the source sentence. In one example, the criterion is either one or both of the reliability of the target sentence exceeding a preset threshold, and the target sentence having a highest reliability among candidate target sentences corresponding to the source sentence.

When the target sentence is determined to be inappropriate as the translation result, the machine translation apparatus re-determines a target sentence corresponding to the source sentence in operation 130. For example, when the target sentence is inappropriate as the translation result, the machine translation apparatus re-determines a target sentence that is appropriate as the translation result.

For example, to re-determine a target sentence corresponding to the source sentence, the machine translation apparatus uses a sentence retrieved from a database (DB) that is similar to the source sentence, adjusts a search technique used in a translation model that translates the source language into the target language, or uses a third language that is different from the source language and the target language. Examples of a process of re-determining a target sentence will be further described below with reference to FIGS. 2 through 6.

When the target sentence is determined to be appropriate as the translation result, the machine translation apparatus outputs the target sentence as text or a speech signal in operation 140. For example, the machine translation apparatus outputs the target sentence by either one or both of converting the target sentence to a speech signal using text-to-speech (TTS) and displaying the target sentence as text on a display.

Figure 2:
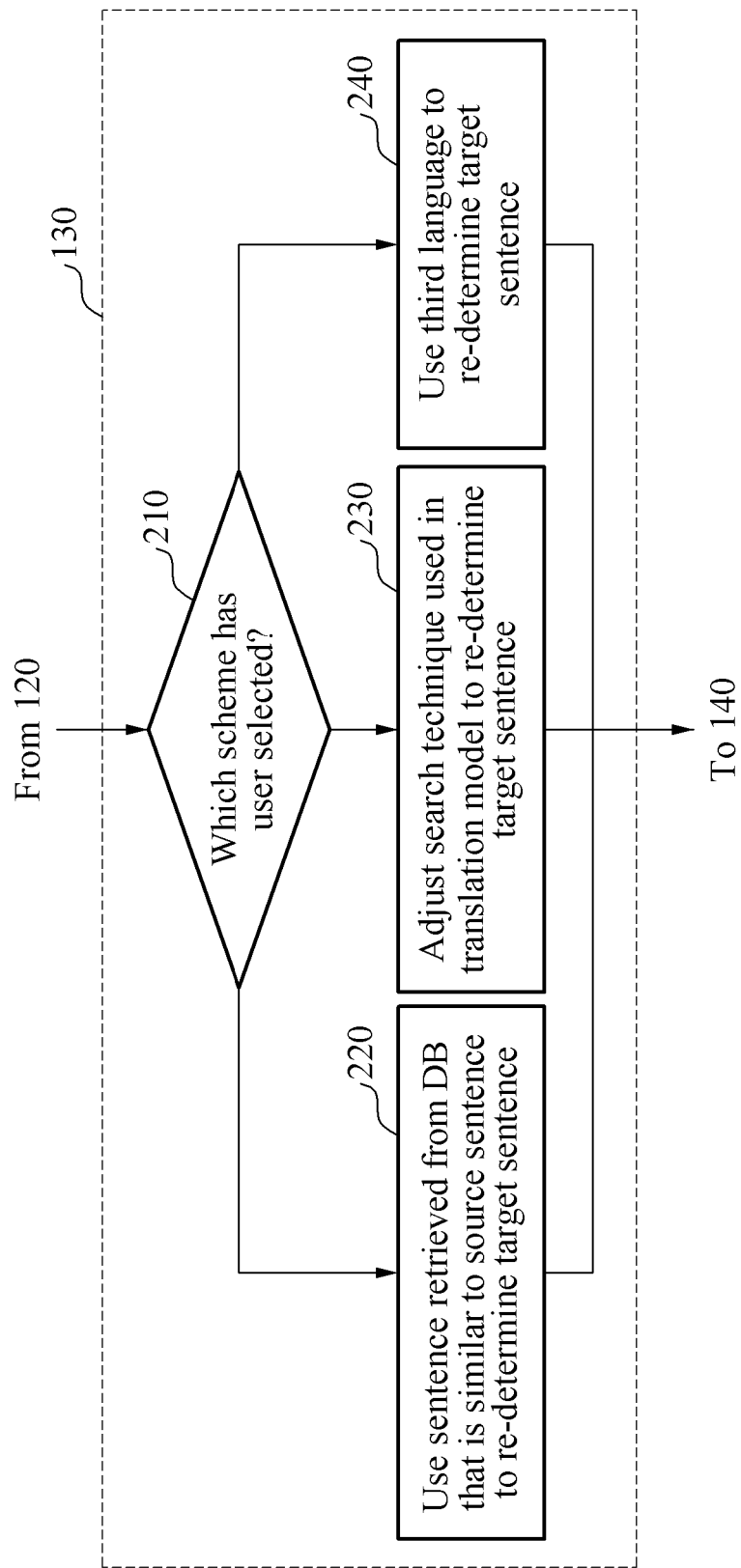
FIGS. 2 and 3 illustrate examples of re-determining a target sentence in the machine translation method of FIG. 1.
Figure 3:
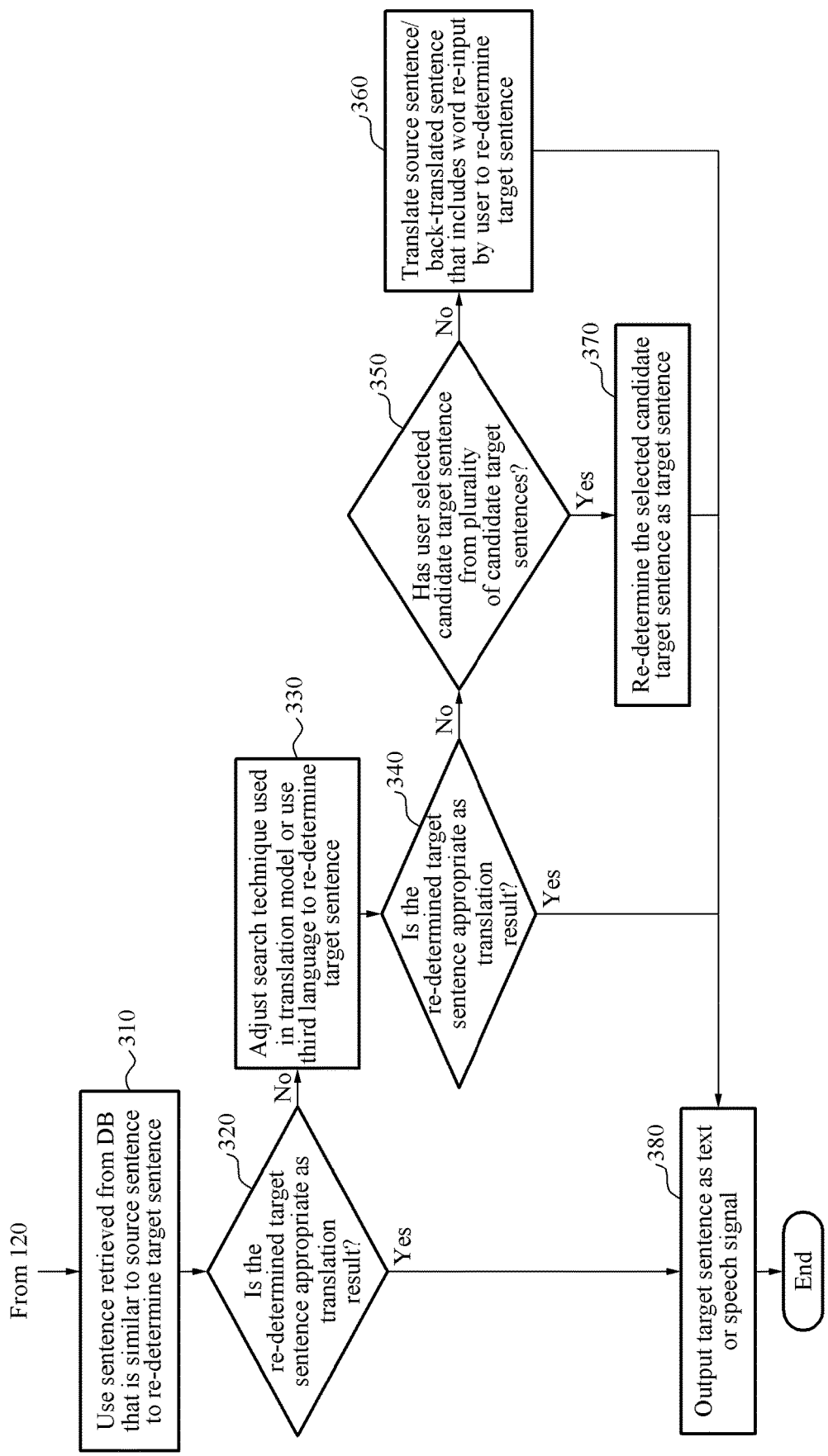

FIGS. 2 and 3 illustrate examples of re-determining a target sentence in the machine translation method of FIG. 1.

FIG. 2 illustrates an example of a process of re-determining a target sentence based on a user's selection.

Referring to FIG. 2, in operation 210, the machine translation apparatus receives, as an input, a selection of a scheme of re-determining a target sentence. For example, the machine translation apparatus receives, from a user, a selection of any one of a scheme of using a sentence retrieved from a DB that is similar to the source sentence, a scheme of adjusting a search technique used in a translation model that translates the source language into the target language, and a scheme of using a third language that is different from the source language and the target language.

In one example, when the scheme of using a sentence retrieved from the DB that is similar to the source sentence is selected, the machine translation apparatus retrieves a sentence similar to the source sentence from a DB that stores sentences that have been successfully translated in operation 220. Also, the machine translation apparatus retrieves a previous translation result of the retrieved sentence from the DB and determines the previous translation result as a target sentence, or translates the retrieved sentence into the target language to re-determine a target sentence.

In another example, when the scheme of adjusting the search technique is selected, the machine translation apparatus adjusts a beam width of a beam search used in the translation model to re-determine a target sentence corresponding to the source sentence in operation 230.

In another example, when the scheme of using the third language is selected, the machine translation apparatus determines a third sentence by translating the source language into the third language, and re-determines a target sentence by translating the third sentence into the target language in operation 240.

FIG. 3 illustrates an example of a process by which the machine translation apparatus automatically re-determines a target sentence without interacting with a user.

When the target sentence is determined to be inappropriate as the translation result in operation 120, the machine translation apparatus re-determines a target sentence based on a sentence retrieved from a DB that is similar to the source sentence in operation 310. This scheme of re-determining a target sentence is a scheme with a lowest processing cost among schemes of re-determining a target sentence because a translation is not actually performed again if a previous translation result of the retrieved sentence is retrieved from the DB and determined as a target sentence.

In operation 320, the machine translation apparatus determines whether the re-determined target sentence is appropriate as the translation result based on, for example, a reliability of the re-determined target sentence.

When the re-determined target sentence is determined to be inappropriate as the translation result in operation 320, the machine translation apparatus adjusts a search technique used in a translation model or uses a third language to re-determine a target sentence in operation 330. The machine translation apparatus re-determines, as a target sentence, a sentence with a highest reliability among sentences acquired by performing either one or both of a scheme of adjusting the search technique used in the translation model and a scheme of using the third language.

In operation 340, the machine translation apparatus determines whether the target sentence re-determined in operation 330 is appropriate as the translation result based on a reliability of the target sentence re-determined in operation 330.

When the re-determined target sentence is also determined to be inappropriate as the translation result in operation 340, the machine translation apparatus provides a user with a plurality of candidate target sentences corresponding to the source sentence generated by the translation model in operation 350. Also, the machine translation apparatus determines whether the user has selected one of the plurality of candidate target sentences in operation 350.

When the machine translation apparatus determines that the user has not selected a candidate target sentence in operation 350, the machine translation apparatus receives, as a re-input from the user, at least one word in either the source sentence or a back-translated sentence generated by translating the target sentence back into the source language in operation 360. The user inspects the back-translated sentence, or the source sentence expressed in the source language, and enters at least one word to modify an expression that may be causing a mistranslation, or make the expression more clear. Then, the machine translation apparatus translates the source sentence or the back-translated sentence that includes the at least one received word into the target language to re-determine a target sentence.

When the machine translation apparatus determines that the user has selected a candidate target sentence in operation 350, the machine translation apparatus re-determines the selected candidate target sentence as a target sentence in operation 370.

When the target sentence re-determined in operation 320 or 340 is determined to be appropriate, or when the target sentence is re-determined in operation 360 or 370, the machine translation apparatus outputs the re-determined target sentence as text or a speech signal in operation 380.

Hereinafter, examples of a scheme of re-determining a target sentence are further described with reference to FIGS. 4 through 6.

FIG. 4 illustrates an example of a process of re-determining a target sentence based on sentences stored in a DB.

FIG. 4 illustrates an example of a DB 400 that stores sentences that have been successfully translated.

In a scheme of using a sentence similar to a source sentence input by a user, a previous target sentence corresponding to a previous source sentence that is most similar to the source sentence is retrieved from a DB in which pairs of previous source sentences and previous target sentences with relatively high reliabilities have been stored.

As shown in FIG. 4, previous target sentences and previous source sentences that have been successfully translated with relatively high reliabilities are mapped to each other and stored in the DB 400. A previous target sentence is a previous translation result of a previous source sentence. The DB 400 also stores a reliability between a previous source sentence and a previous target sentence, but is not limited thereto. In another example, the DB 400 stores a previous source sentence and a previous target sentence without storing a reliability.

A similarity between a source sentence input by a user and a previous source sentence stored in the DB 400 is used similarly to the above-described scheme. In one example, a previous source sentence similar to the source sentence input by the user is retrieved from the DB 400 based on a level of matching between at least one keyword extracted from the source sentence and the previous source sentence stored in the DB 400. In this example, when a level of matching between at least one keyword extracted from the source sentence and the previous source sentence increases, a similarity between the previous source sentence and the source sentence is determined to increase. A keyword is a main word in the source sentence, and includes, for example, a subject, an object, or a predicate in the source sentence, not a complement, an adverb, or a preposition.

For example, the DB 400 stores a previous source sentence that has been successfully translated to obtain a previous target sentence with a high reliability without storing the previous target sentence and the reliability. In this example, the previous source sentence retrieved from the DB 400 that is most similar to a source sentence input by a user is translated using a translation model to re-determine a target sentence.

When a similarity between a source sentence input by a user and a previous source sentence retrieved from the DB 400 that is most similar to the source sentence does not exceed a predetermined threshold, a previous source sentence similar to the source sentence is determined not to be stored in the DB 400. When a previous source sentence similar to the source sentence is not retrieved from the DB 400, the machine translation apparatus modifies the source sentence to obtain a sentence in a normalized form, and translates the modified source sentence into a target language to re-determine a target sentence. For example, the source sentence may be normalized by transforming the source sentence into an easy-to-translate sentence having a predefined sentence format by changing words and word order of the source sentence. Also, the machine translation apparatus substitutes a word having a similar meaning for at least one word in the source sentence, and translates the source sentence including the substituted word into the target language to re-determine a target sentence. The substituted word is, for example, a word that has a higher translation success rate or makes the source sentence more clear than the word in the source sentence.

In one example, when a target sentence is determined to be appropriate as a translation result of a source sentence input by a user, the source sentence and the target sentence are added to the DB 400. In another example, only the source sentence without the target sentence is added to the DB 400.

Although the DB 400 of FIG. 4 corresponds to one pair of a source language A and a target language B, the DB 400 is not limited thereto. In another example, DBs are provided for each pair of a plurality of pairs of a source language and a target language.

Figure 5:
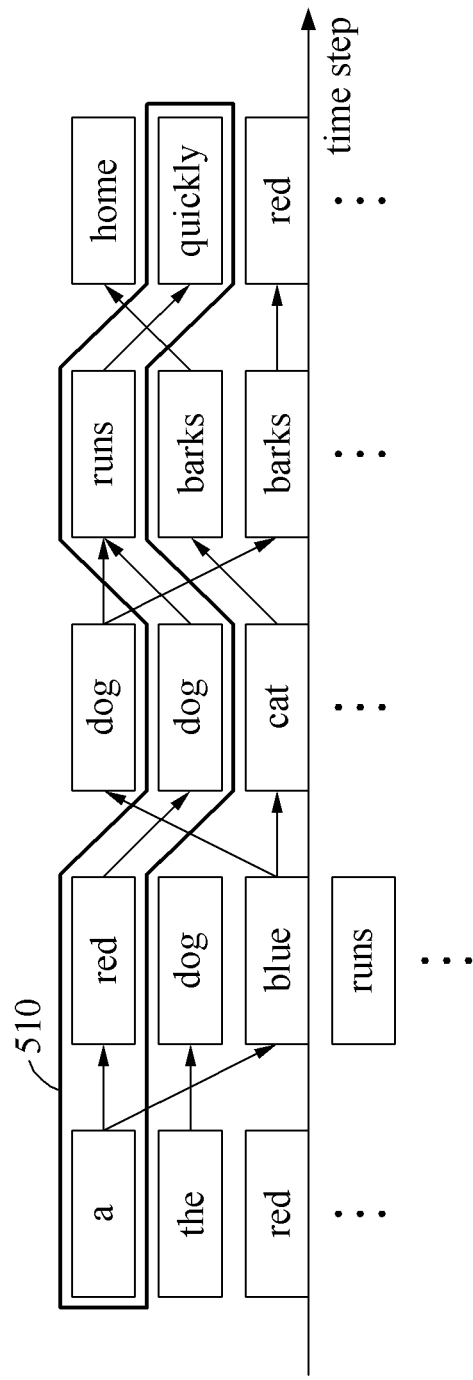
FIG. 5 illustrates an example of a process of re-determining a target sentence by adjusting a beam search used in a translation model.

FIG. 5 illustrates an example of a process of re-determining a target sentence by adjusting a beam search used in a translation model.

FIG. 5 illustrates an example of a beam search process used in a translation model.

A beam search is a technique of finding a correct path in a neural network-based translation model without searching all candidate paths, and an inference is efficiently performed because not all of the candidate paths are searched.

To determine words to be included in a target sentence in the translation model, "n" words having relatively high possibilities among words having possibilities of being used as next words are searched for. For example, referring to FIG. 5, words "red", "dog", "blue", and "runs" having possibilities of following words "a", "the", and "red" are determined, and a predetermined number of candidate words are selected from the determined words. In this example, three candidate words are selected, the words "red", "dog", and "blue" are selected, and the word "runs" is eliminated. Similarly, a target sentence 510 "a red dog runs quickly" is determined. The number of candidate words is referred to as a "beam width" or a "beam size" of the beam search.

As described above, it is possible to effectively find a correct path while reducing a number of operations by searching only a portion of the candidate paths. However, because not all of the candidate paths are searched, an optimal correct path may not be found in the searching in some circumferences.

A machine translation apparatus re-determines a target sentence with a high reliability based on searching a larger number of candidate paths including some candidate paths that were not previously searched by increasing a beam width of a beam search used in a translation model.

Figure 6:
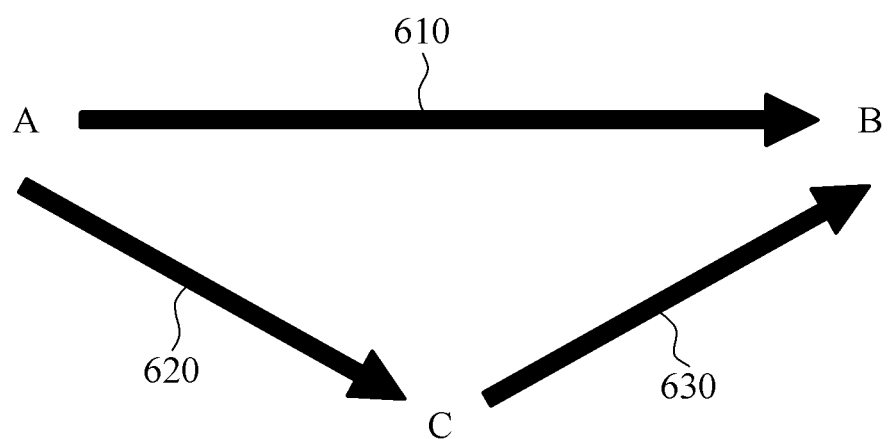
FIG. 6 illustrates an example of a process of re-determining a target sentence using a third language.

FIG. 6 illustrates an example of a process of re-determining a target sentence using a third language.

Referring to FIG. 6, a source sentence A is translated into a target sentence B using the third language.

An accuracy of a translation model may vary depending on a source language and a target language. In one example, an accuracy of a translation model that translates a source language into a target language is low, whereas an accuracy of a translation model that translates the source language into a third language and an accuracy of a translation model that translates the third language into the target language are high.

In this example, a machine translation apparatus translates the source sentence A into the third language to determine a third sentence C, and translates the third sentence C into the target language to determine the target sentence B with a high reliability, instead of translating the source sentence A directly into the target language to determine the target sentence B with a low reliability.

When the target sentence B determined by translating the source sentence A into the target language has a low reliability, the machine translation apparatus translates the source sentence A into the third language to determine the third sentence C, and translates the third sentence C into the target language to re-determine a target sentence.

Figure 7:
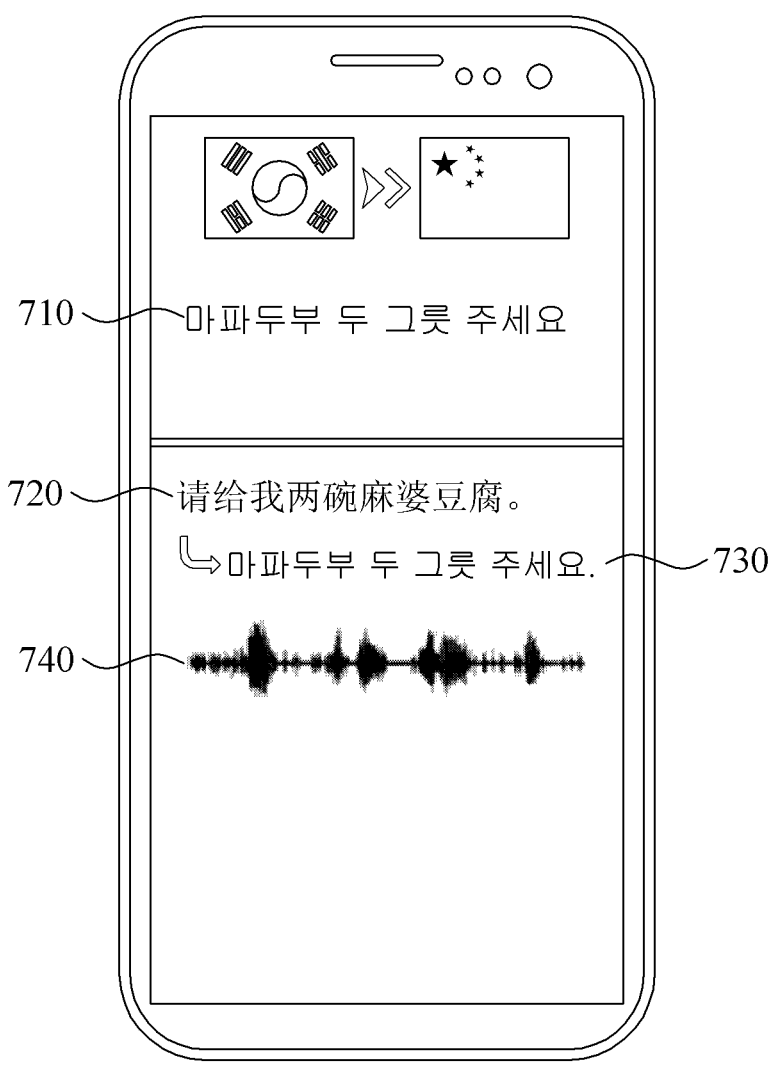
FIGS. 7 and 8 illustrate examples of a user interface to provide a machine translation.
Figure 8:
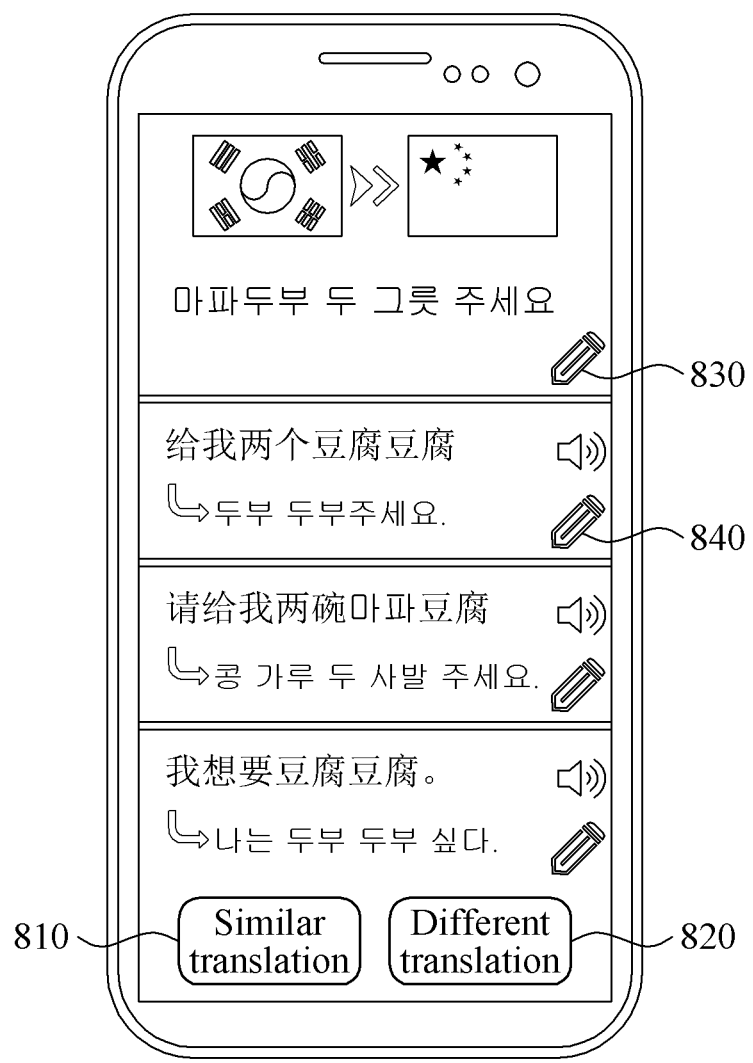

FIGS. 7 and 8 illustrate examples of a user interface to provide a machine translation.

FIG. 7 illustrates an example in which a target sentence 720 with a high reliability is output.

A source sentence 710 expressed in a source language (for example, Korean) is translated into a target language (for example, Chinese) to determine the target sentence 720. When the target sentence 720 is determined to be appropriate as a translation result based on a reliability of the target sentence 720, the target sentence 720 is displayed as and is output as a speech signal 740. Also, a back-translated sentence 730 generated by translating the target sentence 720 back into the source language is additionally output so that a user can verify whether the target sentence 720 has been properly translated.

FIG. 8 illustrates an example in which a target sentence is determined to be inappropriate as a translation result due to a low reliability of the target sentence. When the target sentence is determined to be inappropriate as the translation result, a target sentence is re-determined using one of the schemes described above.

A machine translation apparatus re-determines a target sentence in response to an input of a user's selection. In one example, when a similar translation 810 is selected by a user, a target sentence is re-determined based on a sentence retrieved from a DB that is similar to the source sentence. In another example, when a different translation 820 is selected by the user, a search technique used in a translation model is adjusted or a third language different from a source language and a target language is used to re-determine a target sentence.

In another example, the machine translation apparatus outputs a plurality of candidate target sentences corresponding to the source sentence in a descending order of reliabilities. When one of the candidate target sentences is selected by the user, the selected candidate target sentence is re-determined as a target sentence.

In another example, when an edit button 830 is selected by the user, the machine translation apparatus receives, as a re-input from the user, a word to be substituted for at least one word in the source sentence. When an edit button 840 is selected by the user, the machine translation apparatus receives, as a re-input from the user, a word to be substituted for at least one word in the back-translated sentence generated by translating the target sentence back into the source language. Then, the machine translation apparatus translates the source sentence or the back-translated sentence that includes the at least one received word into the target language to re-determine a target sentence. In one example, when at least one word in the source sentence or the back-translated sentence is selected by the user, a phrase or a word similar to the selected word is retrieved from a DB and displayed to the user so that the user may select the word.

When an input or a selection by a user is required for re-determination of a target sentence, a predetermined amount of time is required to re-determine a target sentence. Thus, when a sentence input by a first user is being translated by the machine translation apparatus and displayed to a second user who is a conversation partner, a message such as "translating" or "please wait for translation" may be displayed on the machine translation apparatus.

In another example, the machine translation apparatus automatically re-determines a target sentence with a high reliability as described above without interacting with a user, and outputs the re-determined target sentence as either one or both of text a speech signal. In this example, since it is not necessary to use a display to receive a user's input, the user can conveniently use the machine translation apparatus by voice alone.

Figure 9:
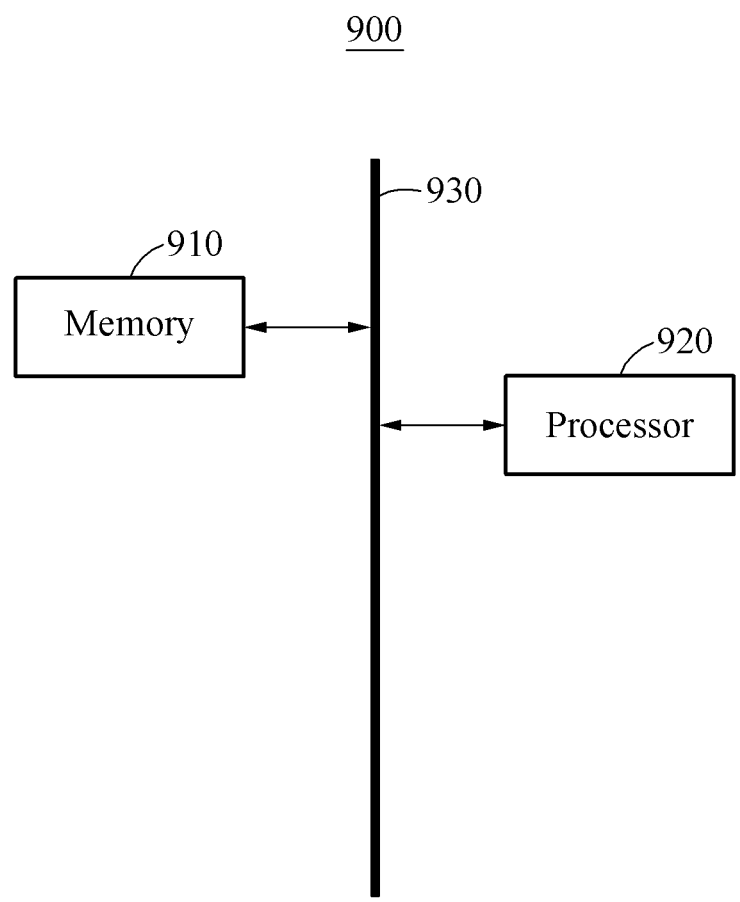
FIGS. 9 and 10 illustrate examples of a machine translation apparatus.
Figure 10:
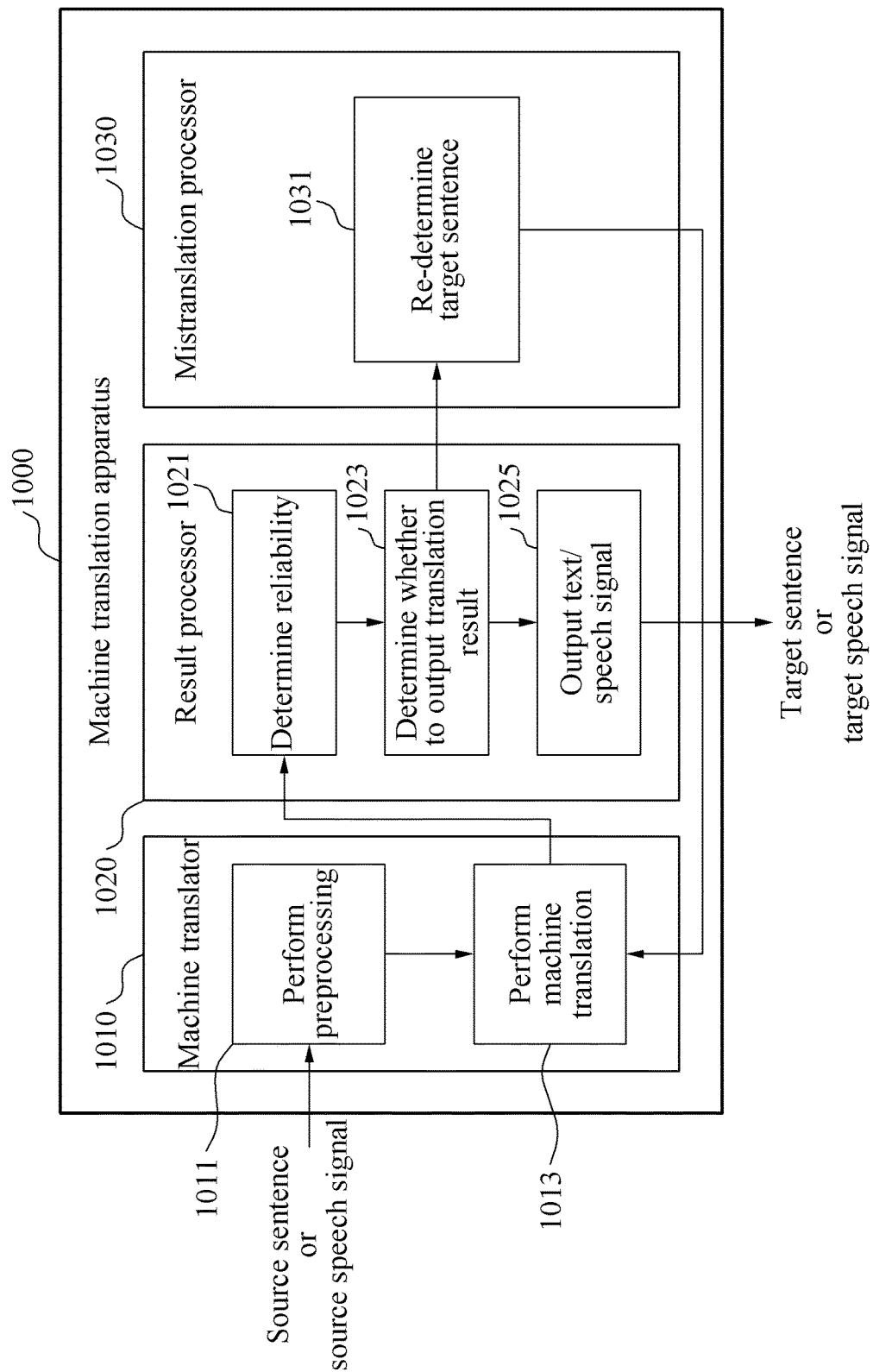

FIGS. 9 and 10 illustrate examples of a machine translation apparatus.

Referring to FIG. 9, a machine translation apparatus 900 includes a memory 910 and a processor 920. The memory 910 and the processor 920 communicate with each other via a bus 930.

The memory 910 stores instructions executable by the processor 920. The processor 920 performs the operations described above with respect to FIGS. 1 through 8 by executing the instructions stored in the memory 910. The memory 910 includes, for example, a volatile memory or a nonvolatile memory.

The processor 920 is, for example, an apparatus configured to execute instructions or programs, or to control the machine translation apparatus 900. The processor 920 translates a source sentence expressed in a source language into a target language to determine a target sentence, and determines, based on a reliability of the target sentence, whether the target sentence is appropriate as a translation result of the source sentence. When the target sentence is determined to be inappropriate as the translation result, the processor 920 re-determines a target sentence corresponding to the source sentence.

Referring to FIG. 10, a machine translation apparatus 1000 includes a machine translator 1010, a result processor 1020, and a mistranslation processor 1030. The machine translation apparatus 1000, the machine translator 1010, the result processor 1020, and the mistranslation processor 1030 may be implemented by a processor, such as the processor 920 of FIG. 1, that performs the operations described above with respect to FIGS. 1 through 8.

The machine translator 1010 performs preprocessing of an input source sentence or a source speech signal in operation 1011. Through the preprocessing, the source speech signal is converted to a source sentence based on a speech recognition model, and the input source sentence or the source sentence generated by converting the source speech signal is modified or processed to be suitable for a machine translation.

Also, the machine translator 1010 translates the source sentence into a target language using a translation model to determine a target sentence in operation 1013. In one example, the machine translator 1010 uses a language model and a decoding process. The machine translator 1010 also determines a back-translated sentence of the target sentence.

The result processor 1020 determines a reliability of a target sentence with a highest probability value among candidate target sentences generated by the machine translator 1010 in operation 1021. The result processor 1020 determines, based on the reliability, whether the target sentence is appropriate as a translation result of the source sentence and is to be output as the translation result in operation 1023.

In one example, when it is determined that the target sentence is appropriate as the translation result and is to be output due to a high reliability, the result processor 1020 outputs the target sentence as either one or both of text and a speech signal in operation 1025.

In another example, when the target sentence is determined to be inappropriate as the translation result due to a low reliability, the mistranslation processor 1030 re-determines a target sentence in operation 1031 using any of the schemes described above with respect to FIGS. 1 through 8.

The machine translation apparatus 900, the memory 910, the processor 920, and the bus 930 in FIG. 9 and the machine translation apparatus 1000, the machine translator 1010, the result processor 1020, and the mistranslation processor 1030 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with respect to FIGS. 1 through 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented machine translation method comprising:
    receiving a text or speech source sentence expressed in a source language using an interface;
    determining a target sentence by translating the source sentence into a target language using a neural network-based translation model;
    in response to determining that the target sentence is not an appropriate translation of the source sentence based on a similarity between the source sentence and a back-translation of the target sentence, determining a second target sentence corresponding to the source sentence based on a retrieved sentence determined as most similar to the source sentence from among successfully-translated sentences of a database (DB);
    in response to determining that the second target sentence is not an appropriate translation of the source sentence based on a similarity between the source sentence and a back-translation of the second target sentence, determining a third target sentence by retranslating the source sentence by either one of increasing a beam width of a beam search used in the neural network-based translation model and using an intermediate third language between the source language and the target language;
    in response to a determination that the third target sentence is not an appropriate translation of the source sentence, providing candidate target sentences corresponding to the source sentence using the interface;
    determining whether an input selecting one of the candidate target sentences has been received through the interface;
    in response to a determination that the input selecting one of the candidate target sentences has been received, determining the selected candidate target sentence to be a fourth target sentence; and
    in response to a determination that the input selecting one of the candidate target sentences has not been received, receiving a replacement word replacing a word in either the target sentence or the back-translation of the target sentence and determining a fifth target sentence by translating either the target sentence including the replacement word or the back-translation of the target sentence into the target language; and
    outputting the fifth target sentence using the interface.

2. The processor-implemented machine translation method of claim 1, wherein
    the sentence retrieved from the DB is a sentence similar to the source sentence, and
    the determining of the second target sentence comprises either re-determining a previous translation result of the retrieved sentence as the target sentence, or re-determining the target sentence by translating the retrieved sentence into the target language.

3. The processor-implemented machine translation method of claim 2, wherein the retrieving of the sentence similar to the source sentence from the DB comprises retrieving the sentence similar to the source sentence from the DB based on either one or both of a similarity between the source sentence and each of the sentences stored in the DB, and a level of matching between a keyword extracted from the source sentence and each of the sentences stored in the DB.

4. The processor-implemented machine translation method of claim 1, wherein the determining of the second target sentence further comprises, in response to a determination that the sentence retrieved from the DB is not a sentence similar to the source sentence, modifying the source sentence to a sentence in a normalized form, and translating the modified source sentence into the target language to re-determine the target sentence.

5. The processor-implemented machine translation method of claim 1, wherein the determining of the second target sentence further comprises, in response to a determination that the sentence retrieved from the DB is not a sentence similar to the source sentence, substituting a word having a similar meaning for at least one word in the source sentence, and translating the source sentence including the substituted word into the target language to re-determine the target sentence.

6. The processor-implemented machine translation method of claim 2, further comprising adding the source sentence and either the target sentence or the second target sentence to the DB in response to a determination that either the target sentence or the second target sentence is appropriate as the translation result.

7. The processor-implemented machine translation method of claim 1, wherein the determining of the third target sentence comprises the increasing of the beam width of the beam search used in the translation model to determine the third target sentence corresponding to the source sentence.

8. The processor-implemented machine translation method of claim 1, wherein the using of the third language comprises:
    translating the source language into a third language to determine a third sentence; and
    translating the third sentence into the target language to re-determine the target sentence.

9. The processor-implemented machine translation method of claim 1, further comprising:
    re-determining a candidate target sentence selected by a user from a plurality of candidate target sentences corresponding to the source sentence as a fourth target sentence; or receiving, as a re-input from the user, at least one replacement word replacing a word in either the source sentence or a back-translated sentence generated by translating the target sentence back into the source language, and translating either the source sentence or the back-translated sentence that includes the at least one replacement word into the target language to re-determine the target sentence.

10. The processor-implemented machine translation method of claim 1, wherein the outputting of the third target sentence using the interface comprises outputting the third target sentence as either one or both of text and a speech signal in response to a determination that the third target sentence is appropriate as the translation result.

11. A non-transitory computer-readable medium storing instructions that, when executed by a processor, cause the processor to perform the processor-implemented machine translation method of claim 1.

12. A machine translation apparatus comprising:
a processor;
a memory storing at least one instruction that is executable by the processor,
wherein the processor executing the at least one instruction configures the processor to:
    determine a target sentence by translating a text or speech source sentence expressed in a source language into a target language using a neural-network based translation model,
    in response to determining that the target sentence is not an appropriate translation of the source sentence based on a similarity between the source sentence and a back-translation of the target sentence, determine a second target sentence corresponding to the source sentence based on a retrieved sentence determined as most similar to the source sentence from among successfully-translated sentences of a database (DB),
    in response to determining that the second target sentence is not an appropriate translation of the source sentence based on a similarity between the source sentence and a back-translation of the second target sentence, determine a third target sentence by retranslating the source sentence by either one of increasing a beam width of a beam search used in the neural network-based translation model and using an intermediate third language between the source language and the target language,
    in response to a determination that the third target sentence is not an appropriate translation of the source sentence, provide candidate target sentences corresponding to the source sentence using the interface,
    determine whether an input selecting one of the candidate target sentences has been received through the interface,
    in response to a determination that the input selecting one of the candidate target sentences has been received, determine the selected candidate target sentence to be a fourth target sentence, and
    in response to a determination that the input selecting one of the candidate target sentences has not been received, receive a replacement word replacing a word in either the target sentence or the back-translation of the target sentence and determine a fifth target sentence by translating either the target sentence including the replacement word or the back-translation of the target sentence into the target language; and
an interface configured to receive the source sentence and output the third fifth target sentence.

13. The machine translation apparatus of claim 12, wherein
the sentence retrieved from the DB is a sentence similar to the source sentence, and
for the determining of the second target sentence, the processor is configured to either re-determine a previous translation result of the retrieved sentence as the target sentence, or re-determine the target sentence by translating the retrieved sentence into the target language.

14. The machine translation apparatus of claim 12, wherein the processor is further configured to determine the third target sentence by the increasing of the beam width of the beam search used in the translation model to determine the third target sentence corresponding to the source sentence.

15. The machine translation apparatus of claim 12, wherein, for the using of the third language, the processor is further configured to:
translate the source language into a third language to determine a third sentence; and
translate the third sentence into the target language to re-determine the target sentence.

16. The machine translation apparatus of claim 12, wherein, for the outputting of the third target sentence using the interface, the processor is further configured to output the third target sentence as either one or both of text and a speech signal in response to a determination that the third target sentence is appropriate as the translation result.

17. A processor-implemented machine translation method comprising:
receiving a text or speech source sentence expressed in a source language using an interface;
determining a target sentence by translating the source sentenced into a target language using a neural network-based translation model;
outputting, using the interface, the target sentence as a translation result of the source sentence in response to a similarity between the source sentence and a back-translation of the target sentence satisfying a predetermined criterion;
in response to the similarity of the target sentence not satisfying the predetermined criterion, determining a second target sentence corresponding to the source sentence based on a retrieved sentence determined as most similar to the source sentence from among successfully-translated sentences of a database (DB);
outputting, using the interface, the second target sentence as a re-determined translation result of the source sentence in response to a similarity between the source sentence and a back-translation of the second target sentence satisfying the predetermined criterion;
in response to the similarity of the second target sentence not satisfying the predetermined criterion, determining a third target sentence by retranslating the source sentence by either one of increasing a beam width of a beam search used in the neural network-based translation model and using an intermediate third language between the source language and the target language;
in response to the similarity of the third target sentence not satisfying the predetermined criterion, providing candidate target sentences corresponding to the source sentence using the interface;

determining whether an input selecting one of the candidate target sentences has been received through the interface;

determining the selected candidate target sentence to be a fourth target sentence and outputting, using the interface, the fourth target sentence as another re-determined translation result of the source sentence in response to a determination that the input selecting one of the candidate target sentences has been received;

in response to a determination that the input selecting one of the candidate target sentences has not been received, receiving a replacement word replacing a word in either the target sentence or the back-translation of the target sentence and determining a fifth target sentence by translating either the target sentence including the replacement word or the back-translation of the target sentence into the target language; and outputting, using the interface, the fifth target sentence as another re-determined translation result of the source sentence in response to a similarity between the source sentence and a back-translation of the fifth target sentence satisfying the predetermined criterion.

18. The processor-implemented machine translation method of claim 17, wherein the predetermined criterion is the similarity of the respective one of the target sentences exceeding a preset threshold.

19. The processor-implemented machine translation method of claim 17, wherein:
the sentence retrieved from the DB is a sentence that is similar to the source sentence; and
the determining of the second target sentence comprises translating the retrieved source sentence into the target language to obtain the second target sentence.

20. The processor-implemented machine translation method of claim 17, wherein:
the sentence retrieved from the DB is a previous translation result of a sentence that is similar to the source sentence; and
the determining of the second target sentence comprises determining the retrieved previous translation result as the second target sentence.

21. The processor-implemented machine translation method of claim 17, wherein the translation model uses the beam search to find an optimal translation, and
the determining of the third target sentence comprises:
the increasing the beam width; and
translating the source sentence into the target language using the translation model having the adjusted beam width to obtain the third target sentence.

22. The processor-implemented machine translation method of claim 21, wherein the increasing of the beam width comprises increasing the beam width of the beam search.

23. The processor-implemented machine translation method of claim 17, wherein the determining of the third target sentence comprises:
translating the source sentence into the third language to determine a third sentence; and
translating the third sentence into the target language to obtain the third target sentence.

24. The processor-implemented method of claim 17, further comprising:
providing candidate target sentences corresponding to the source sentence; and receiving an input selecting one of the candidate target sentences as a re-determined target sentence.

25. The processor-implemented method of claim 17, further comprising:
receiving a replacement word replacing a word in either the target sentence or a back-translated sentence obtained by translating the target sentence back into the source language; and
translating either the target sentence including the replacement word or the back-translated sentence including the replacement word into the target language to obtain a re-determined target sentence.

26. A processor-implemented machine translation method comprising:
translating a source sentenced expressed in a source language into a target language to determine a target sentence corresponding to the source sentence;
outputting, using an interface, the target sentence as a translation result of the source sentence in response to a determination that the target sentence is an appropriate translation of the source sentence based on a similarity between the source sentence and a back-translation of the target sentence;
in response to a determination that the target sentence is not an appropriate translation of the source sentence, obtaining a first re-determined target sentence corresponding to the source sentence based on a sentence that is similar to the source sentence and is stored in a database (DB) storing sentences that have been successfully translated;
outputting, using the interface, the first re-determined target sentence as a translation result of the source sentence in response to a determination that the first re-determined target sentence is an appropriate translation of the source sentence based on a similarity between the source sentence and a back-translation of the first re-determined target sentence;
in response to a determination that the first re-determined target sentence is not an appropriate translation of the source sentence, obtaining a second re-determined target sentence by either
increasing a beam width of a beam search of a neural network-based translation model used to translate the source sentence into the target sentence, and translating the source sentence into the target language using the translation model having the increased beam width to obtain the second re-determined target sentence, or
translating the source sentence into an intermediate third language between the source language and the target language to determine a third sentence, and translating the third sentence into the target language to obtain the second re-determined target sentence;
outputting, using the interface, the second re-determined target sentence as a translation result of the source sentence in response to a determination that the second re-determined target sentence is an appropriate translation of the source sentence based on a similarity between the source sentence and a back-translation of the second re-determined target sentence;
in response to a determination that the second re-determined target sentence is not an appropriate translation of the source sentence, providing candidate target sentences corresponding to the source sentence;
determining whether an input selecting one of the candidate target sentences has been received;
in response to a determination that the input selecting one of the candidate target sentences has been received, determining the selected candidate target sentence to be a third re-determined target sentence, and outputting, using the interface, the third re-determined target sentence as a translation result of the source sentence; and in response to a determination that the input selecting one of the candidate target sentences has not been received, receiving a replacement word replacing a word in either the target sentence or the back-translation of the target sentence, translating either the target sentence including the replacement word or the back-translation of the target sentence including the replacement word into the target language to obtain a fourth re-determined target sentence; and outputting, using the interface, the fourth re-determined target sentence as a translation result of the source sentence.

\* \* \* \* \*